United States Patent [11] 3,624,222

[72] Inventor Rolland W. Nelson
 1125 18th St., West Des Moines, Iowa 50265
[21] Appl. No. 542,441
[22] Filed Mar. 22, 1966
[45] Patented Nov. 30, 1971

[54] PRESERVATIVE AND NITRATE REDUCING AGENT FOR RAW AGRICULTURAL CROPS
1 Claim, No Drawings

[52] U.S. Cl. .................................................... 424/128, 424/317, 99/8
[51] Int. Cl. ........................................................ A01n 13/00
[50] Field of Search ......................................... 167/22 G, 13; 99/8, 224; 252/259.5; 424/128, 317

[56] References Cited
UNITED STATES PATENTS
2,078,537 4/1937 Henglein et al. ............... 99/8
1,318,174 10/1919 Plaisance ...................... 99/1
1,627,342 5/1927 Sabalitschka ................. 99/224

FOREIGN PATENTS
13,863 7/1891 Great Britain

OTHER REFERENCES
Chem. Abstracts Vol. 52 7626c, Aqueous Solutions Of Essential Oils Kohlstaedt et al.
Chem. Abstracts, Vol. 52, 6666a, Feed Spoilage, Richardson et al.
J. Pharm. & Pharmacology, Vol. 4, Pg. 577, 581 Heseltine
Textbook of Organic Chemistry, Noller 2nd Ed. Pg. 418
Pharmaceutical Recipe Book, 2nd Ed. 1936 Pg. 325

*Primary Examiner*—Albert T. Meyers
*Assistant Examiner*—Vincent D. Turner
*Attorney*—Dick, Zarley, McKee and Thomte

ABSTRACT: A preservative and nitrate reducing agent for raw agricultural crops consisting of an inorganic acid, namely, phosphoric acid, and an organic substance consisting substantially of propionic acid. The method of reducing the nitrate value of crops by treating said crops with the foregoing composition.

PRESERVATIVE AND NITRATE REDUCING AGENT FOR RAW AGRICULTURAL CROPS

The cutting of forage crops and their subsequent storage for animal feeding purposes creates a variety of problems. Bacterial growth on the cut crop gives rise to mold growth, some of which is toxic to the animals. Mold and bacterial growth adversely affects the nutrient value of the crops. The green color of the crop deteriorates which also accelerates a depreciation of the nutrient value of the crop. In addition, crops raised on heavily fertilized soils often have such a high nitrate content that they are toxic to the animals.

Therefore, a principal object of this invention is to provide a preservative and nitrate reducing agent for raw agricultural crops that will effectively reduce bacterial and mold growth in the crop and substantially extend its storage life.

A further object of this invention is to provide a preservative and nitrate reducing agent for raw agricultural crops which will preserve the beta carotene (green color) of the crop.

A still further object of this invention is to provide a preservative and nitrate reducing agent for raw agricultural crops which will preserve the protein and other nutrients of the crop.

A still further object of this invention is to provide a preservative and nitrate reducing agent for raw agricultural crops which will enhance the flavor of the crop.

A still further object of this invention is to provide a preservative and nitrate reducing agent for raw agricultural crops which will substantially reduce the nitrate content of the crop.

These and other objects will be apparent to those skilled in the art.

The compound contemplated by this invention is made in both a liquid and a dry form, for the different forms are each more convenient to use in various applications.

The composition of the compound of this invention is as follows:

| Ingredient | | Preferred Proportion By Weight | Permissible Range Of Proportions |
|---|---|---|---|
| Inorganic Acid (Phosphoric Acid) | | 70% | 55–80% |
| Organic Acid | | 26% | 15–30% |
| | Propionic Acid 20% | | (20–28%) |
| | Lactic Acid 5% | | (1–9%) |
| | Benzoic Acid 1% | | (trace–2%) |
| Flavors | | 4% | 1–5% |
| Methyl Paraben | | 0.1% | trace |

The function of these ingredients will be discussed below.

Inorganic Acid. While sulfuric, hydrochloric and nitric acids do serve to attack bacteria and mold, they are difficult to handle. It was determined that phosphoric acid served very well in providing bactericidal action, and it renders the mold spores ineffective for reproduction if some mold does occur before the bacteria action normally would have taken place. In addition, this preferred inorganic acid complements the other components as will be discussed hereafter. The organic acids mentioned above would all be used in the proportional ranges described above.

Organic Acid. Examples of organic acids suitable for use in this invention are citric, propionic, lactic, succinic, fumaric, benzoic, and adipic, although a combination of propionic, lactic and benzoic acids has proven to be more desirable. The preferred ratio is four parts by weight of propionic acid to one part of lactic acid, whereupon the propionic acid constitutes 20 percent of the total compound; the lactic acid forms 5 percent of the compound; and the benzoic acid forms 1 percent of the compound, based upon the preferred use of 26 percent of organic acid used as suggested above.

The organic acids also attack and inhibit the bacteria and mold growth discussed above in regard to the inorganic acid. The propionic acid also inhibits the mycelcium formers, and it has been determined that the combination of phosporic acid and propionic acid kills a much broader range of bacteria than either of these acids can do by themselves. In addition, the lactic acid kills the reproduction germ of the grain, and by so doing, the grain ages more quickly and stops the germinating process of taking in oxygen and giving off carbon dioxide. The effectiveness of the compound is reduced approximately 50 percent if the organic acids are present in proportions below the 15 to 30 percent listed above, and the compound is not economically feasible if this range is exceeded.

The benzoic acid works as a mold and bacteria inhibitor, just as do the lactic and propionic acids, and it has been determined that the resulting compound works more effectively with the benzoic acid present than without. It may be that the benzoic acids act as a metabolite which is a nonnutrient upon which the bacteria will feed but will starve to death.

Flavors. An oil-type flavoring agent should be used, such as anise oil, orange oil, lemon oil, or tangerine oil. The flavors enhance the taste of the crop, but it has been determined that these flavoring agents exert bactericidal activity.

Methyl Paraben. This substance is a preservative and suppresses the growth of mold and bacteria. It is used only in trace amounts, but its presence complements the other components and results in an improved product.

To manufacture the liquid form of the product, the liquid inorganic and organic acids are mixed, and the powder, sodium benzoate (in the desired proportion by weight of the benzoic acid) is added to and dissolved in the mixed acids. A sufficient amount of an emulsifier, such as a fatty acid, is added to the flavors to put the flavors into a clear solution, and the flavors are then added to the mixed acids along with a trace of the methyl paraben powder.

When the dry compound is made, the inorganic acid in liquid form is mixed with the liquid lactic acid. This liquid substance is thereupon sprayed on a drying or absorbing agent, such as silica. Sufficient drying agent is used to reduce the resulting composition to a powder or granular form. Sodium benzoate and sodium propionate (in powder form) are then added in the respective desired proportions of propionic acid and benzoic acid, which are chemically formed as the respective salts of these acids are mixed with the dried inorganic and lactic acids. Dry flavors are then added.

The ingredients of both the dry and the wet compositions should be thoroughly mixed. The wet mixture is usually applied to the feed or crop involved by spraying, and the dry composition is usually sprinkled on the crop. It has been determined that the application of either the dry of liquid form of this invention substantially reduces both bacterial and mold growth. The green color of roughage crops is retained longer and the nutrient value of all treated crops is much higher than when not treated. In addition, the nitrate value of untreated crops is reduced at least 50 percent when the crops are treated with the composition of this invention. Furthermore, the treated crop, whether grain or roughage, is highly palatable. It has also been determined that by feeding this composition directly to fowls, such as chickens and turkeys, the growth of mold within the craw of the fowl is substantially inhibited.

The reduction of the nitrate is accomplished by the reaction of the phosphitide with nitrogen to reduce the nitrate toxicity. The assimilation of the nitrate by the animal if thereupon substantially reduced.

It is therefore seen that this invention will accomplish at least all of its stated objectives.

Various changes and modifications may be made in carrying out the present invention, PRESERVATIVE AND NITRATE REDUCING AGENT FOR RAW AGRICULTURAL CROPS, without departing from the spirit and scope thereof. Insofar as these changes and modifications are within the purview of the annexed claim, they are to be considered as part of my invention.

I claim:

1. A crop preservative and nitrate assimilation composition, comprising:
   an inorganic acid, said inorganic acid being essentially phosphoric acid,
   and an organic acid substance consisting substantially of propionic acid, said inorganic substance comprising approximately 55 to 80 percent by weight of said composition, and said organic acid substance comprising approximately 20 to 28 percent by weight of said composition.

* * * * *